United States Patent
Jang et al.

(10) Patent No.: US 9,500,407 B2
(45) Date of Patent: Nov. 22, 2016

(54) APPARATUS AND METHOD FOR DRYING

(71) Applicant: SAMSUNG SDI CO., LTD., Yongin-si, Gyeonggi-do (KR)

(72) Inventors: Woo Jin Jang, Suwon-si (KR); Tae Sik Kim, Suwon-si (KR); Jin Kyu Park, Suwon-si (KR); Hun Young Park, Suwon-si (KR); Jun Ho Chung, Suwon-si (KR); Bong Hyun Cho, Suwon-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 81 days.

(21) Appl. No.: 14/495,135

(22) Filed: Sep. 24, 2014

(65) Prior Publication Data

US 2015/0089831 A1 Apr. 2, 2015

(30) Foreign Application Priority Data

Sep. 27, 2013 (KR) ........................ 10-2013-0114993

(51) Int. Cl.
*F26B 5/00* (2006.01)
*F26B 13/10* (2006.01)
*H01M 2/14* (2006.01)
*H01M 2/16* (2006.01)

(52) U.S. Cl.
CPC .............. *F26B 13/10* (2013.01); *H01M 2/145* (2013.01); *H01M 2/1646* (2013.01); *H01M 2/1653* (2013.01); *H01M 2/1686* (2013.01)

(58) Field of Classification Search
CPC ............ F26B 5/00; F26B 5/14; H01M 2/00; H01M 2/14; B23B 37/00
USPC .................... 34/306, 218, 406; 156/286, 382
See application file for complete search history.

(56) References Cited

U.S. PATENT DOCUMENTS

| | | | | |
|---|---|---|---|---|
| 1,410,580 A | * | 3/1922 | Lane | B22C 9/12 34/233 |
| 1,458,403 A | * | 6/1923 | Glessner | F26B 5/04 34/196 |
| 6,686,566 B1 | * | 2/2004 | Corey | F26B 3/283 198/817 |
| 7,526,878 B2 | * | 5/2009 | Sonobe | F26B 3/283 118/719 |
| 8,898,929 B2 | * | 12/2014 | Stewart | D06F 59/04 134/103.2 |
| 2006/0150434 A1 | * | 7/2006 | Rydell | F26B 13/101 34/241 |
| 2013/0337368 A1 | * | 12/2013 | Doyen | C25B 1/12 429/509 |
| 2015/0089831 A1 | * | 4/2015 | Jang | H01M 2/145 34/406 |

(Continued)

FOREIGN PATENT DOCUMENTS

| | | | |
|---|---|---|---|
| JP | S37011294 B | | 8/1962 |
| JP | 62064067 A | * | 3/1987 |
| JP | 06-344325 A | | 12/1994 |

(Continued)

*Primary Examiner* — Stephen M Gravini
(74) *Attorney, Agent, or Firm* — Lee & Morse, P.C.

(57) ABSTRACT

A drying apparatus that dries a porous membrane that is carryable along a predetermined direction and a drying method, the drying apparatus including a housing; a plurality of air suppliers arranged in the housing along the predetermined direction so as to inject air toward the porous membrane; and a plurality of air exhausters arranged in the housing along the predetermined direction so as to exhaust air that has been injected from the air suppliers to an exterior of the housing, wherein the plurality of air suppliers are symmetrically arranged with one another at opposite sides of the porous membrane to face each other with the porous membrane disposable therebetween.

13 Claims, 5 Drawing Sheets

(56) References Cited

U.S. PATENT DOCUMENTS

2015/0255780 A1* 9/2015 Tsuchiya ............... F26B 13/10
                                                          427/58
2016/0006009 A1* 1/2016 Kim ..................... H01M 2/145
                                                          429/246

FOREIGN PATENT DOCUMENTS

| JP | 5194745 B2 | 5/2013 | | |
|---|---|---|---|---|
| JP | 2013-108045 A | 6/2013 | | |
| KR | 20150034973 A | * | 4/2015 | ............ H01M 2/145 |
| WO | WO 2013172576 A1 | * | 11/2013 | ............. G05D 21/02 |

* cited by examiner

APPARATUS AND METHOD FOR DRYING

CROSS-REFERENCE TO RELATED APPLICATION

Korean Patent Application No. 10-2013-0114993, filed on Sep. 27, 2013, in the Korean Intellectual Property Office, and entitled: "Apparatus and Method for Drying," is incorporated by reference herein in its entirety.

BACKGROUND

1. Field

Embodiments relate to an apparatus and method for drying

2. Description of the Related Art

A roll-to-roll system may be used to continuously perform printing or coating on a sheet-shaped material such as a film, a sheet of paper, and the like. A roll-to-roll system may employ various drying methods such as roll support drying, float drying, air knife drying, and the like, depending upon performance of single-sided coating or double-sided coating.

Among these methods, float drying may be used for double-sided coating, in which a coated sheet-shaped material is floated by air to prevent contamination thereof. In float drying, the coated sheet-shaped material to be dried may be floated from an inlet of a drying apparatus towards an outlet by air heated to a predetermined temperature. The drying apparatus may include an air supplier (or an air supply nozzle) to supply air for floating, and an air exhauster to exhaust air along with volatilized solvent generated while the heat resistant layer is dried.

SUMMARY

Embodiments are directed to an apparatus and method for drying.

The embodiments may be realized by providing a drying apparatus that dries a porous membrane that is carryable along a predetermined direction, the drying apparatus including a housing; a plurality of air suppliers arranged in the housing along the predetermined direction so as to inject air toward the porous membrane; and a plurality of air exhausters arranged in the housing along the predetermined direction so as to exhaust air that has been injected from the air suppliers to an exterior of the housing, wherein the air suppliers are symmetrically arranged with one another at opposite sides of the porous membrane to face each other with the porous membrane disposable therebetween.

The air exhausters may be symmetrically arranged with one another at the opposite sides of the porous membrane to face each other with the porous membrane disposed therebetween.

The air suppliers and the air exhausters may be alternately arranged with each other along the predetermined direction at one side of the porous membrane.

The drying apparatus may further include main air supply pipes extending from outside of the housing into an interior of the housing; and branched air supply pipes branched from the main air supply pipes and connected to each of the air suppliers, wherein air injected toward the porous membrane through the air suppliers is provided through the main air supply pipes and the branched air supply pipes.

The drying apparatus may further include branched air exhaust pipes respectively connected to the air exhausters; and main air exhaust pipes to which each of the branched air exhaust pipes is connected, wherein air inside the housing is exhausted to an exterior of the housing through the branched air exhaust pipes and the main air exhaust pipes.

Each of the air suppliers may include a perforated plate having a plurality of through-holes therein.

The porous membrane carried inside the housing may include a separator for secondary batteries.

A deviation in flow rate of air among the plurality of air suppliers may be less than 5%.

A width of each air supplier taken along the predetermined direction may be greater than a width of each air exhauster taken along the predetermined direction.

The embodiments may be realized by providing a drying method including forming positive pressure zones with a plurality of air suppliers that are arranged along a predetermined direction such that the positive pressure zones are on a surface of a porous membrane being carried in the predetermined direction within a housing; and forming negative pressure zones with a plurality of air exhausters that are arranged along the predetermined direction, wherein the positive pressure zones are symmetrically formed at positions facing each other on opposite sides of the porous membrane.

The negative pressure zones may be symmetrically formed at positions facing each other on opposite surfaces of the porous membrane The positive pressure zones and the negative pressure zones may be alternately arranged with each other along the predetermined direction.

The negative pressure zones may be on a surface of the porous membrane being carried in the predetermined direction within the housing.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Hereinafter, a drying apparatus according to embodiments will be described in more detail with reference to the accompanying drawings. For example, in the following description, by way of example, a drying apparatus and method according to the embodiments is applied to a pre-zone of the drying apparatus in a process of drying a separator of a secondary battery, without being limited thereto. In an implementation, the embodiments may be applied to various kinds of sheet-shaped material. In this specification, a "sheet-shaped material" is regarded as including a porous membrane such as a separator.

Figure 1A:
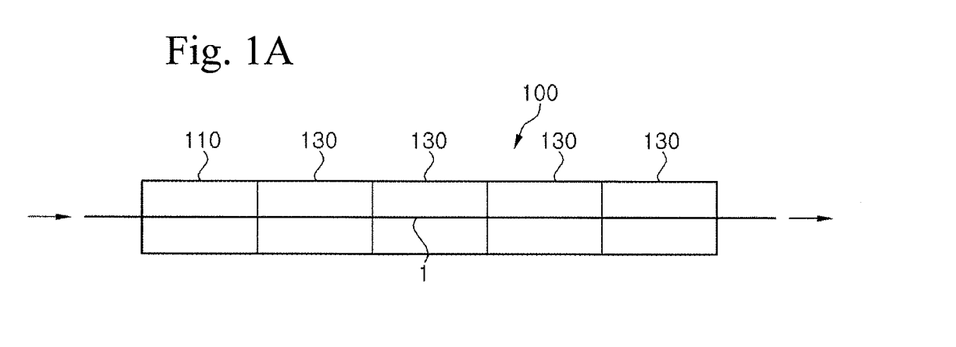
FIG. 1A illustrates a schematic view of a horizontal drying apparatus.
Figure 1B:
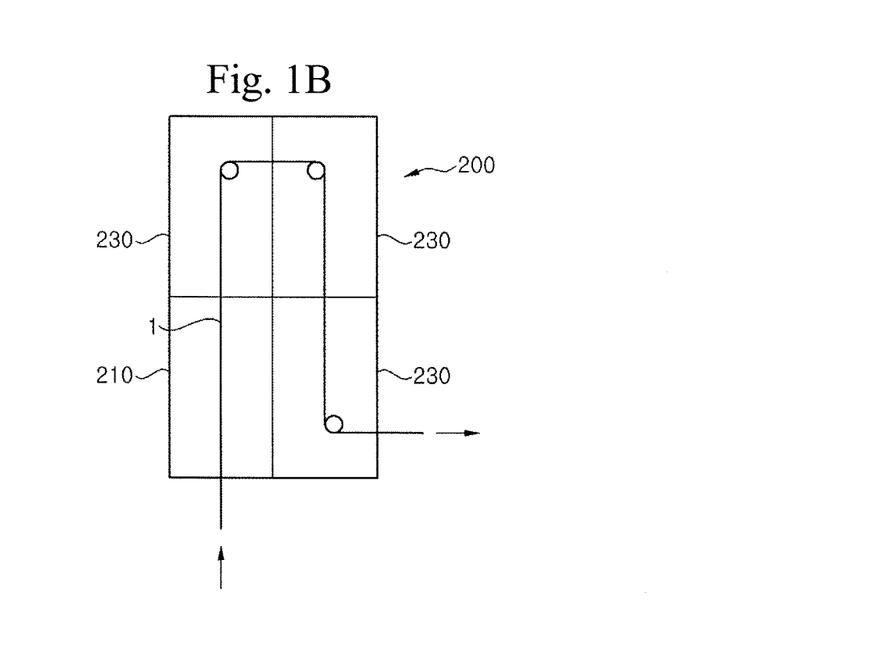
FIG. 1B illustrates a schematic view of a vertical drying apparatus.
Figure 2:
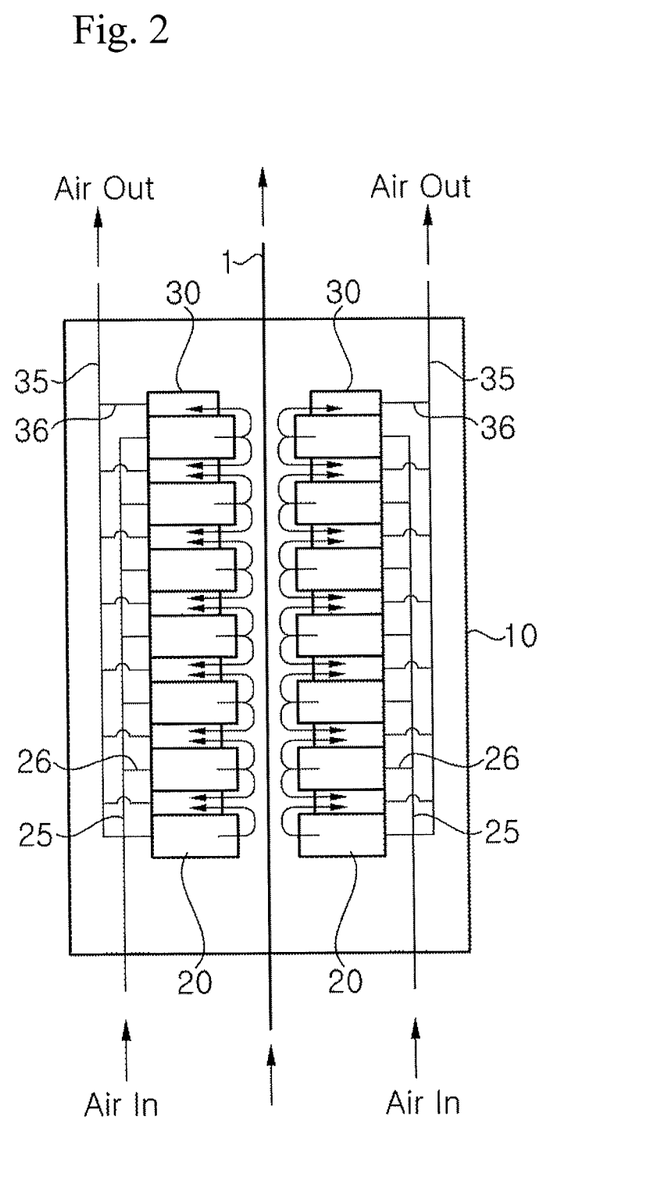
FIG. 2 illustrates a schematic side view of a drying apparatus according to a first embodiment.
Figure 3A:
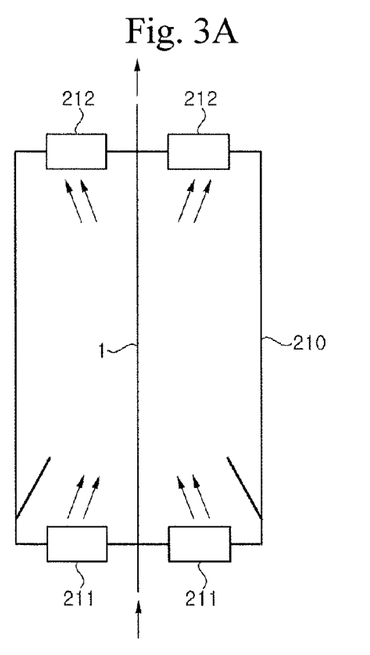
FIG. 3A illustrates a schematic view of an atmospheric drying zone of the drying apparatus according to the first embodiment.
Figure 3B:
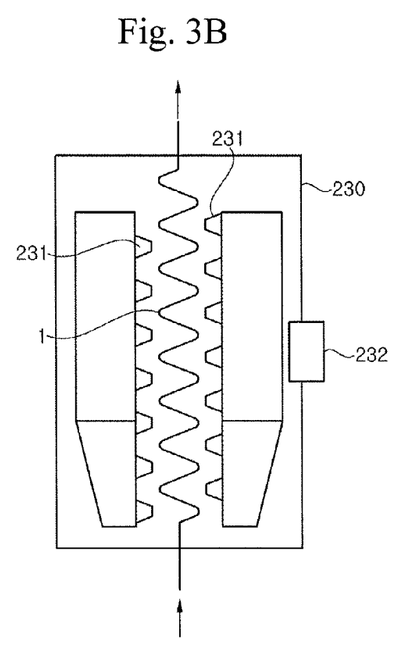
FIG. 3B illustrates a schematic view of a direct drying zone of the drying apparatus according to the first embodiment.

First, a drying apparatus according to a first embodiment will be described with reference to FIGS. 1A to 3B. The drying apparatus according to an embodiment may be used to dry, e.g., separators for secondary batteries. FIG. 1A illustrates a schematic view of a horizontal drying apparatus, FIG. 1B illustrates a schematic view of a vertical drying apparatus, FIG. 2 illustrates a schematic side view of a drying apparatus according to the first embodiment, FIG. 3A illustrates a schematic view of an atmospheric drying zone of the drying apparatus, and FIG. 3B illustrates a schematic view of a direct drying zone of the drying apparatus.

A separator for secondary batteries may be a porous film manufactured through uni-axial or bi-axial stretching of polyolefin polymers such as polyethylene or polypropylene. In fabrication of such a separator, an organic/inorganic heat-resistant layer or adhesive layer including inorganic particles or an organic coating layer may be coated onto one or both sides of the polyolefin porous separator in order to help improve heat resistance of the separator or adhesion between the separator and electrodes. The heat-resistant layer or adhesive layer may be formed by, e.g., lamination, co-extrusion, or coating processes. A drying apparatus may be used to dry the separators, e.g., separators that have been coated with a coating liquid.

In an implementation, the drying apparatus may be a horizontal drying apparatus 100 in which a sheet-shaped material 1 (such as a separator) is subjected to drying operation while being carried in a horizontal direction, as shown in FIG. 1A. In an implementation, the drying apparatus may be a vertical drying apparatus 200 in which the sheet-shaped material 1 is subjected to the drying operation while being carried in a vertical direction, as shown in FIG. 1B.

The drying apparatus according to an embodiment may have an internal space partitioned into a plurality of zones, regardless of whether it is the horizontal drying apparatus 100 or the vertical drying apparatus 200, i.e., regardless of its type or shape. Thus, the drying apparatus may allow the sheet-shaped material 1 (coated with the coating liquid) to be gradually dried while successively passing through the plurality of zones.

A zone within a first drying furnace or area where the drying operation is first performed may be a pre-zone. The first drying operation may be performed immediately after application of the coating liquid. As shown in FIGS. 1A and 1B, an atmospheric drying zone 110 or 210 may be provided as the pre-zone, and may be placed at the uppermost stream within the drying apparatus with respect to a carrying direction of the sheet-shaped material.

Referring to FIG. 2, the first drying furnace of the drying apparatus according to the first embodiment for drying the sheet-shaped material 1, e.g., a porous membrane such as a separator, may include a hollow housing 10 (through which the sheet-shaped material 1 may be carried in a predetermined direction), a plurality of air suppliers 20 (that inject or direct air to or toward the sheet-shaped material being carried inside the housing 10), and a plurality of air exhausters 30 (that exhaust or redirect air injected from the air supplier 20 to an outside of the housing 10).

The sheet-shaped material 1 coated with the coating liquid may enter a lower side of the housing 10 and may then be carried upwardly, e.g., may be vertically moved upwardly within the housing 10.

At opposite sides of the sheet-shaped material 1, the plurality of air suppliers 20 may be vertically arranged and spaced apart from each other, e.g., in the vertical direction. Likewise, the plurality of air exhausters 30 may also be vertically arranged and spaced apart from each other, e.g., in the vertical direction. In an implementation, and as shown in FIG. 2, the air suppliers 20 and the air exhausters 30 may be alternately arranged with each other, e.g., along the vertical direction.

In addition, the air suppliers 20 and the air exhausters 30 arranged at opposite sides of the sheet-shaped material 1 being carried may be respectively arranged to face each other. For example, the air suppliers 20 may be symmetrically arranged with respect to one another on opposite side of the sheet-shaped material 1 and/or the air exhausters 30 may be symmetrically arranged with respect to one another on opposite side of the sheet-shaped material 1. For example, the drying apparatus according to the first embodiment may have a bilaterally symmetrical structure with respect to the sheet-shaped material 1. In an implementation, the air suppliers 20 and the air exhausters 30 (respectively arranged to face each other at the opposite sides of the sheet-shaped material 1) may be controlled to have a same velocity and/or flow rate of air relative to each other. For example, the flow rate and/or velocity of the air may be the same along the predetermined direction on the opposite sides of the sheet-shaped material 1. Thus, generation of tension, stress, or uneven pressure may be fundamentally removed or decreased, thereby helping to reduce the likelihood of and/or prevent the sheet-shaped material 1 from shaking.

Next, advantageous effects of the drying apparatus according to this embodiment will be described in more detail with reference to FIGS. 3A and 3B. In the first zone, e.g., the atmospheric drying zone 110 or 210, a drying operation based on atmospheric drying may be performed with respect to or on the sheet-shaped material 1 that has been subjected to coating operation. In addition, in a direct drying zone 130 or 230 (downstream from the atmospheric drying zone 110 or 210), a drying operation may be performed by a direct drying method in which air is directly injected or directed to or toward the surface of the sheet-shaped material 1.

FIG. 3A shows one example of an atmospheric drying zone 210 as the pre-zone of the vertical drying apparatus. The atmospheric drying zone 210 may be a zone in which the drying operation is performed immediately after the coating liquid is applied to the sheet-shaped material 1. For example, if air were to be directly injected to or toward the sheet-shaped material 1 through a nozzle in the atmospheric drying zone 210, the coating liquid could be pushed or distorted by the air. The atmospheric drying zone 210 may be provided with or in a drying apparatus having a structure wherein air having high temperature (e.g., 120° C.) is supplied into the atmospheric drying zone 210 through only one or two air suppliers 211 such that the sheet-shaped material 1 may be subjected to drying operation under a high temperature atmosphere, and the air may then be suctioned and exhausted from the atmospheric drying zone 210 through only one or two air exhausters 212. In a drying apparatus of the atmospheric drying zone 210 with this configuration, air may be supplied and exhausted mainly through one side, air velocity may be unbalanced in a zone where air is supplied and exhausted intensively, shaking of the sheet-shaped material that is being carried may occur, and undried coating liquid could be unevenly deposited to or moved on the surface of the sheet-shaped material, thereby causing swells or creases on the sheet-shaped material.

FIG. 3B shows one example of a direct drying zone 230 of a vertical drying apparatus. In the direct drying zone 230, the coating liquid may be at least partially dried already by atmospheric drying performed in the atmospheric drying zone 210 (e.g., upstream in the drying apparatus). Thus, air may be directly injected or directed to the surface of the sheet-shaped material 1 such that the sheet-shaped material 1 may be quickly dried. For example, in the direct drying zone 230, a plurality of air supply nozzles 231 may be arranged in zigzag or offset configuration at opposite sides of the sheet-shaped material 1 along a moving direction of the sheet-shaped material 1. Air having high temperature and high pressure may be directly injected to or directed toward the sheet-shaped material 1 through the air supply nozzles 231, thereby performing the drying operation. In addition, air in the direct drying zone 230 may be suctioned and discharged through an air exhauster 232 at one side thereof. In the direct drying zone 230, if the air exhauster 232 is biased to one side, pressure distribution could be less than uniform between the one side and another side of the sheet-shaped material 1 to be dried. Thus, a difference in velocity of air could occur, and controlling airflow could be difficult. Accordingly, the sheet-shaped material 1 could shake excessively.

The drying apparatus according to the first embodiment may include the air suppliers 20 and the air exhausters 30 respectively arranged to face each other at opposite sides of the sheet-shaped material 1, as shown in FIG. 2. The drying apparatus according to the first embodiment may maintain a uniform pressure distribution within the housing 10, and may help prevent the carried sheet-shaped material 1 from shaking, e.g., to a greater degree than a drying apparatus that include only one or two air suppliers 211 and/or only one or two air exhausters 212, as shown in FIG. 3A.

Referring back to FIG. 2, air injected to or directed toward the sheet-shaped material 1 through the air suppliers 20 may be supplied through main air supply pipes 25 at left and right, e.g., opposite, sides of the sheet-shaped material 1, respectively, and branched air supply pipes 26 extending from the main air supply pipes 25 and connected to the air suppliers 20.

In addition, air injected to or directed toward the sheet-shaped material 1 through the air suppliers 20, together with volatile components of the coating liquid, may be suctioned into the respective air exhausters 30, and then exhausted to the outside of the housing 10 through branched air exhaust pipes 36 (respectively connected to the air exhausters 30) and through main air exhaust pipes 35 (to which the branched air exhaust pipes 36 is connected). For example, the main air exhaust pipes 35 may also be disposed at the left and right, e.g., opposite, sides of the sheet-shaped material 1, respectively, as shown in FIG. 2.

In an implementation, as shown in FIG. 2, the main air supply pipes 25 may extend into or penetrate the housing 10 through the bottom of the housing 10, and the main air exhaust pipes 35 may extend to the outside of or penetrate the housing 10 through the top of the housing 10. In another implementation, the main air supply pipes may pass through the top or left and right walls of the housing, and/or the main air exhaust pipes may pass through the bottom or left and right walls of the housing.

The air suppliers 20 and the air exhausters 30 (e.g., alternately arranged in or along the vertical direction) may have the same length (e.g., a dimension in the horizontal direction of FIG. 4), and the air suppliers 20 may have a greater width (e.g., a longer dimension in the vertical direction of FIG. 4) than the air exhausters 30. Advantageously, the horizontal lengths of the air suppliers 20 and the air exhausters 30 may be greater than the width of the sheet-shaped material 1 to be carried.

Figure 4:
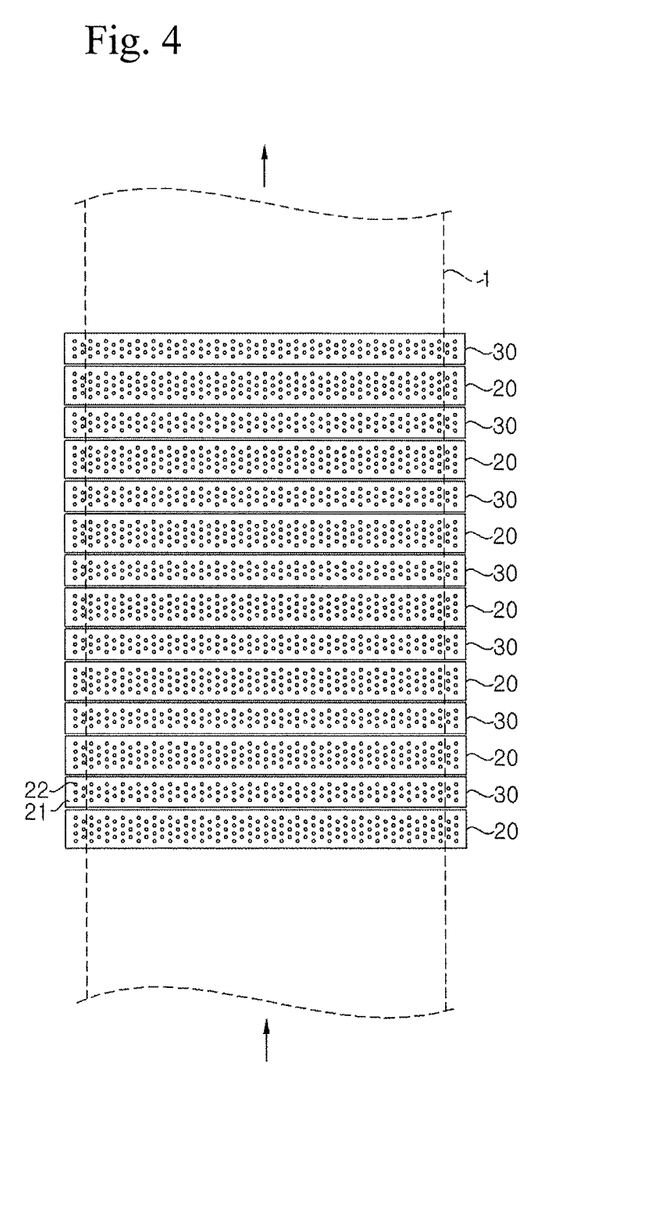
FIG. 4 illustrates a schematic front view of a drying apparatus according to a second embodiment, viewed above a plane on which a sheet-shaped material is carried.
Figure 5:
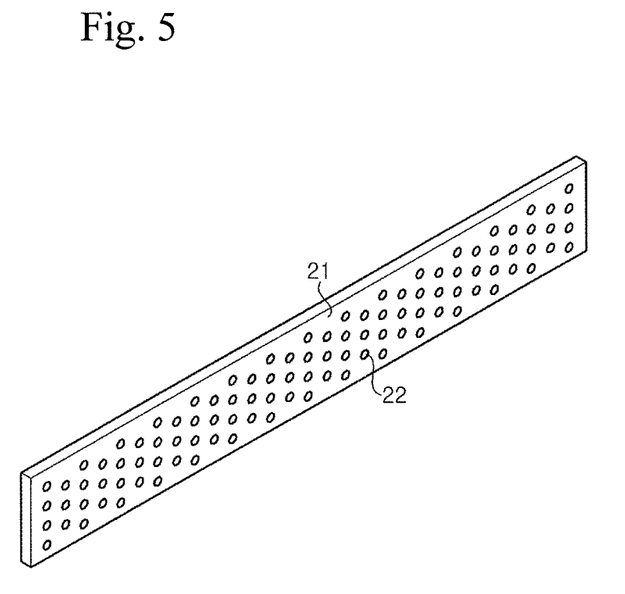
FIG. 5 illustrates a perspective view of an air supplier of the drying apparatus according to the second embodiment.

Next, a drying apparatus according to a second embodiment will be described with reference to FIGS. 4 and 5. Referring to FIGS. 4 and 5, each of the air suppliers 20 may include a perforated plate 21 having a plurality of through-holes 22 therein. Thus, air may be smoothly or uniformly injected to or directed toward the sheet-shaped material 1, e.g., without being concentrated on one place. Although not shown, at least one perforated plate may be further provided between the air supplier and the branched air supply pipe, inside the branched air supply pipe, or between the branched air supply pipe and the main air supply pipe, such that air may be supplied with uniform pressure throughout the overall area of the air supplier 20.

Referring to FIG. 4, each of the air exhausters 30 may include a perforated plate 21. Likewise, although not shown, at least one perforated plate may be further provided between the air exhauster and the branched air exhaust pipe, inside the branched air exhaust pipe, or between the branched air exhaust pipe and the main air exhaust pipe.

FIG. 5 shows one example of the perforated plate 21 manufactured by, e.g., forming a plurality of circular through-holes 22 on a plate. In an implementation, the shape of the through-hole may be changed, or the perforated plate 21 may be replaced by a mesh formed with, e.g., approximately diamond-shaped holes.

According to an embodiment, the flow rate and velocity of air injected from the air suppliers 20 may be controlled while the perforated plate 21 is disposed in front of or at an end of each of the air suppliers 20, thereby allowing the drying operation to be performed by directly injecting air to or toward the sheet-shaped material, even immediately after application of the coating liquid. For example, the drying apparatus according to an embodiment may be usable even when the coating liquid on the sheet is not yet dried, without causing unevenness, swells, or creases, in the dried coating layer.

The drying apparatus according to an embodiment may be applied to the direct drying zone as well as the pre-zone, e.g., the atmospheric drying zone. In order to be applied to the direct drying zone, the drying apparatus for the direct drying zone may utilize the air suppliers 20 as shown in FIG. 2 or 4.

Next, operation of the drying apparatus with the foregoing configuration according to the embodiments will be described with reference to the drawings.

As shown in FIG. 2, the drying apparatus according to an embodiment may be configured to directly inject air to or toward the surface of the sheet-shaped material 1 from the plurality of air suppliers 20 at the opposite sides of the sheet-shaped material 1 that is being carried.

According to an embodiment, the air suppliers 20 may be arranged to face each other (with the sheet-shaped material therebetween) such that no tension or stress may be applied to the sheet-shaped material 1, even when air is directly injected to the sheet-shaped material 1 that is being carried. Thus, undesirable shaking of the sheet-shaped material 1 may be reduced and/or prevented. For example, positive pressure zones formed by air injected from the air suppliers 20 may be aligned (e.g., symmetrically aligned) at positions facing each other on both surfaces of the sheet-shaped material 1. In an implementation, a velocity and/or quantity of air in or from the air suppliers 20 (facing each other) may be set such that the positive pressure zones formed by the air suppliers 20 have approximately the same pressure on both surfaces of the sheet-shaped material 1. For example, an approximately equal amount of pressure may be applied to the aligned opposite sides of the sheet-shaped material 1, thereby reducing and/or preventing undesirable shaking of the sheet-shaped material.

In an implementation, each of the air suppliers 20 may be provided with the perforated plate 21 (having the plurality of through-holes 22) so as to help reduce the likelihood of and/or prevent the undried coating liquid from being pushed in one or an uneven direction on the surface of the sheet-shaped material 1, even when air is directly injected to the sheet-shaped material 1 that is being carried.

Air injected into the housing from the air suppliers 20 may be discharged to the outside of the housing 10 through the air exhausters 30 that are alternately arranged with, e.g., between, the air suppliers 20. In an implementation, the air exhausters 30 may be arranged to face each other, e.g., with the sheet-shaped material 1 therebetween, and uniform airflow may be generated in the housing 10, thereby helping to prevent the sheet-shaped material 1 from shaking. For example, negative pressure zones formed by air suctioned through the air exhausters 30 may be formed at positions aligned with and facing each other on both, e.g., opposing, surfaces of the sheet-shaped material 1. In an implementation, the velocity and quantity of air in the air exhausters 30 facing each other may be set such that the negative pressure zones formed by the air exhauster 30 may have approximately the same pressure on both surfaces of the sheet-shaped material 1. For example, an approximately equal negative or reduced pressure may be present at the aligned opposite sides of the sheet-shaped material 1, thereby reducing and/or preventing undesirable shaking of the sheet-shaped material.

As used herein, the "positive pressure zone" refers to a region in which pressure is higher than that of surrounding regions on the surface of the sheet-shaped material, due to air injected through the air suppliers. The "negative pressure zone" refers to a region in which pressure is lower than that of surrounding regions on the surface of the sheet-shaped material, due to air suctioned through the air exhausters.

According to an embodiment, deviation in flow rate of air between the air suppliers 20 (that are, e.g., vertically, arranged at both sides of the sheet-shaped material 1) may be set within ±5%. For example, the air suppliers 20 may be arranged to face each other and may provide a constant or uniform flow rate of air.

Therefore, the drying apparatus may remove tension or reduce stress applied to the sheet-shaped material by maintaining constant, uniform, or even pressure on both surfaces of the sheet-shaped material 1 to be dried, thereby preventing undesirable shaking of the sheet-shaped material and undesirable generation of swells or creases on the sheet-shaped material.

In the above description, the drying apparatus and method according to an embodiment has been described as being applied to the pre-zone, e.g., the atmospheric drying zone of the vertical drying apparatus in the process of drying the separator for secondary batteries. However, in an implementation, the drying apparatus and method may also be used for drying various kinds of sheet-shaped materials as well as the porous membrane such as the separator.

In an implementation, the embodiments may also be applied to the direct drying zone of the vertical drying apparatus, or to an atmospheric drying zone or a direct drying zone of the horizontal drying apparatus.

When the embodiments are applied to the horizontal drying apparatus, the air suppliers and the air exhausters may be arranged above and below a sheet-shaped material that is being carried in the horizontal direction, in which the air suppliers and the air exhausters are respectively grouped and arranged to face each other, such that the drying apparatus may have a vertically symmetrical structure with respect to the sheet-shaped material. In an implementation, in consideration that the sheet-shaped material may sag due to gravity, the velocity and quantity of air injected from the air suppliers arranged below the sheet-shaped material may be greater than those of the air suppliers arranged above the sheet-shaped material.

By way of summation and review, air may be supplied and exhausted mainly through one side of the apparatus, and air velocity may be unbalanced in a zone in which a drying operation is performed, thereby causing shaking of the sheet-shaped material that is being carried. Undried coating liquid may be unevenly deposited to the surface of the sheet-shaped material, thereby causing swells or creases.

In an effort to help reduce and/or prevent generation of swells or creases on the sheet-shaped material, a pinch roll or a clip may be used to support opposite edges of the sheet-shaped material while being carried. Such a method may cause edges of the sheet-shaped material to be stretched by the pinch roll or expanded by the clip. Thus, a process of removing the defective edges from the sheet-shaped material in a final stage may be performed.

The embodiments may provide a drying apparatus and a drying method using the same, in which air suppliers and air exhausters are alternately arranged and respectively grouped to face each other with a sheet-shaped material, e.g., a porous membrane, disposed therebetween, whereby the porous membrane being carried in a housing can be prevented from shaking, thereby reducing and/or preventing generation of swells or creases on the porous membrane.

In the drying apparatus and method according to an embodiment, it is possible to maintain constant pressure at both surfaces of the porous membrane being carried for drying, thereby preventing the porous membrane from shaking and thus reducing or preventing generation of swells or creases on the porous membrane.

The embodiments may provide an apparatus and a method for drying a sheet-shaped material including a heat resistant layer.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A drying apparatus that dries a porous membrane that is carryable along a predetermined direction, the drying apparatus comprising:
    a housing;
    a plurality of air suppliers arranged in the housing along the predetermined direction so as to inject air toward the porous membrane; and
    a plurality of air exhausters arranged in the housing along the predetermined direction so as to exhaust air that has been injected from the air suppliers to an exterior of the housing,
    wherein the air suppliers are symmetrically arranged with one another at opposite surfaces of the porous membrane to face each other with the porous membrane disposable therebetween.

2. The drying apparatus as claimed in claim 1, wherein the air exhausters are symmetrically arranged with one another at the opposite surfaces of the porous membrane to face each other with the porous membrane disposed therebetween.

3. The drying apparatus as claimed in claim 1, wherein the air suppliers and the air exhausters are alternately arranged with each other along the predetermined direction at one surface of the porous membrane.

4. The drying apparatus as claimed in claim 1, further comprising:
    main air supply pipes extending from outside of the housing into an interior of the housing; and
    branched air supply pipes branched from the main air supply pipes and connected to each of the air suppliers,
    wherein air injected toward the porous membrane through the air suppliers is provided through the main air supply pipes and the branched air supply pipes.

5. The drying apparatus as claimed in claim 1, further comprising:
    branched air exhaust pipes respectively connected to the air exhausters; and
    main air exhaust pipes to which each of the branched air exhaust pipes is connected,
    wherein air inside the housing is exhausted to an exterior of the housing through the branched air exhaust pipes and the main air exhaust pipes.

6. The drying apparatus as claimed in claim 1, wherein each of the air suppliers includes a perforated plate having a plurality of through-holes therein.

7. The drying apparatus as claimed in claim 1, wherein the porous membrane carried inside the housing includes a separator for secondary batteries.

8. The drying apparatus as claimed in claim 1, wherein a deviation in flow rate of air among the plurality of air suppliers is less than 5%.

9. The drying apparatus as claimed in claim 1, wherein a width of each air supplier taken along the predetermined direction is greater than a width of each air exhauster taken along the predetermined direction.

10. A drying method, comprising:
    forming positive pressure zones with a plurality of air suppliers that are arranged along a predetermined direction such that the positive pressure zones are on a surface of a porous membrane within a housing;
    carrying the porous membrane in the predetermined direction within the housing; and
    forming negative pressure zones with a plurality of air exhausters that are arranged along the predetermined direction,
    wherein the positive pressure zones are symmetrically formed at positions facing each other on opposite surfaces of the porous membrane.

11. The drying method as claimed in claim 10, wherein the negative pressure zones are symmetrically formed at positions facing each other on opposite surfaces of the porous membrane.

12. The drying method as claimed in claim 10, wherein the positive pressure zones and the negative pressure zones are alternately arranged with each other along the predetermined direction.

13. The drying method as claimed in claim 10, wherein the negative pressure zones are on a surface of the porous membrane being carried in the predetermined direction within the housing.

* * * * *